United States Patent
Belluomini et al.

(10) Patent No.: US 9,274,751 B2
(45) Date of Patent: *Mar. 1, 2016

(54) FUSED BOOTH ENCODER MULTIPLEXER

(75) Inventors: Wendy Ann Belluomini, Austin, TX (US); Hung Cai Ngo, Austin, TX (US); Jun Sawada, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1683 days.

This patent is subject to a terminal disclaimer.

(21) Appl. No.: 11/776,454

(22) Filed: Jul. 11, 2007

(65) Prior Publication Data

US 2008/0010333 A1    Jan. 10, 2008

Related U.S. Application Data

(63) Continuation of application No. 10/675,674, filed on Sep. 30, 2003, now Pat. No. 7,272,624.

(51) Int. Cl.
*G06F 7/533* (2006.01)
*G06F 7/483* (2006.01)
*G06F 7/544* (2006.01)

(52) U.S. Cl.
CPC .............. *G06F 7/5338* (2013.01); *G06F 7/533* (2013.01); *G06F 7/483* (2013.01); *G06F 7/5443* (2013.01); *G06F 2207/3872* (2013.01)

(58) Field of Classification Search
CPC ............................. G06F 7/533; G06F 7/5338
USPC ................................................. 708/725, 728
See application file for complete search history.

(56) References Cited

U.S. PATENT DOCUMENTS

| | | |
|---|---|---|
| 4,969,118 A | 11/1990 | Montoye et al. |
| 5,040,139 A | 8/1991 | Tran |
| 5,208,489 A | 5/1993 | Houston |
| 5,375,078 A | 12/1994 | Hrusecky et al. |
| 5,471,410 A | 11/1995 | Bailey et al. |
| 5,623,683 A | 4/1997 | Pandya |
| 5,748,517 A | 5/1998 | Miyoshi et al. |
| 5,773,995 A | 6/1998 | Crocker |
| 5,818,743 A | 10/1998 | Lee et al. |

(Continued)

OTHER PUBLICATIONS

Jachong et al., 470ps 64bit Parallel binary adder, 2000. IEEE, pp. 192-193.

(Continued)

*Primary Examiner* — Chuong D Ngo
(74) *Attorney, Agent, or Firm* — William J. Stock; Jack V. Musgrove

(57) ABSTRACT

A multiplier circuit comprises a fused Booth encoder multiplexer which produces partial product bits, a tree which uses the partial product bits to generate partial products, and an adder which uses the partial products to generate intermediate sum and carry results for a multiplication operation. The fused Booth encoder multiplexer utilizes encoder-selector cells having a logic tree which carries out a Boolean function according to a Booth encoding and selection algorithm to produce one of the partial product bits at a dynamic node, and a latch connected to the dynamic node which maintains the value at an output node. The encoder-selector cells operate in parallel to produce the partial product bits generally simultaneously. A given one of the encoder-selector cells has a unique set of both multiplier operand inputs and multiplicand operand inputs, and produces a single partial product bit.

5 Claims, 6 Drawing Sheets

(56) References Cited

U.S. PATENT DOCUMENTS

| | | |
|---|---|---|
| 5,993,051 A | 11/1999 | Jiang et al. |
| 6,021,424 A | 2/2000 | Chu |
| 6,173,304 B1 | 1/2001 | Goldovsky et al. |
| 6,275,841 B1 | 8/2001 | Potter et al. |
| 6,393,446 B1 | 5/2002 | Dhong et al. |
| 6,393,454 B1 | 5/2002 | Chu |
| 6,404,236 B1 * | 6/2002 | Bernstein et al. ............... 326/98 |
| 6,496,038 B1 * | 12/2002 | Sprague et al. ................. 326/95 |
| 6,567,835 B1 | 5/2003 | Blomgren et al. |
| 6,571,268 B1 | 5/2003 | Giacalone et al. |
| 6,717,442 B2 * | 4/2004 | Campbell ....................... 326/95 |
| 6,721,774 B1 | 4/2004 | Lee et al. |
| 6,813,626 B1 | 11/2004 | Chng et al. |
| 6,877,022 B1 | 4/2005 | Toyonoh et al. |
| 7,024,445 B2 | 4/2006 | Qi |
| 7,272,624 B2 * | 9/2007 | Belluomini et al. .......... 708/628 |
| 2001/0009012 A1 | 7/2001 | Itoh |

OTHER PUBLICATIONS

Chris et al., Timed Circuits: A New paradigm for high-speed design, 2001, IEEE, pp. 335-340.

* cited by examiner

Booth Encoder output

FUSED BOOTH ENCODER MULTIPLEXER

CROSS-REFERENCE TO RELATED APPLICATION

This application is a continuation of U.S. patent application Ser. No. 10/675,674 filed on Sep. 30, 2003 U.S. Pat. No. 7,272,624.

BACKGROUND OF THE INVENTION

1. Field of the Invention

The present invention generally relates to data processing systems, more specifically to logic circuits which perform arithmetic functions, and particularly multipliers that use Booth encoders.

2. Description of the Related Art

Data processing systems such as computers or digital signal processors use electronic logic circuits to perform various arithmetic functions including addition, multiplication, etc. These calculations are carried out by an arithmetic logic unit using binary arithmetic. Two common arithmetic logic units are the fixed-point unit and the floating-point unit. A fixed-point unit is used for integer operations, i.e., the source operands for a fixed-point unit are both integers. A floating-point unit is used for non-integer multiplication and division. In order to understand how an arithmetic logic unit (ALU) carries out binary arithmetic, it is useful to understand floating-point notation. Floating-point notation (also referred to as exponential notation) can be used to represent both very large and very small numbers, and thus makes it easier to handle a wide range of arithmetic operations.

A floating-point notation has three parts: a mantissa (or significand), an exponent, and a sign (positive or negative). The mantissa specifies the digits of the number, and the exponent specifies the magnitude of the number, i.e., the power of the base which is to be multiplied with the mantissa to generate the number. For example, using base 10, the number 28330000 would be written as 2833E+4, and the number 0.054565 would be represented as 54565E-6. However, since processors use binary values, an ALU uses 2 as the base (radix). Thus, a number may generally be expressed in binary terms according to the form $$n = (-1)^S \times 1.F \times 2^E,$$

where n is the floating point number (in base 10), S is the sign of the number (0 for positive or 1 for negative), F is the fractional component of the mantissa (in base 2), and E is the exponent of the radix.

In most conventional computer systems, an integer number is represented with 32 bits or 64 bits. Similarly, a "single precision" floating point number is represented with 32 bits (one word), and a "double-precision" floating point number is represented using a 64-bit (two word) field. In accordance with the Institute of Electronic and Electrical Engineers (IEEE) standard 754, a single-precision floating-point number uses the 32 bits as follows: the first bit indicates the sign (S), the next eight bits indicate the exponent offset by a bias amount of 127 (E+bias), and the last 23 bits indicate the fractional portion (F) of the mantissa. So, for example, the decimal number ten would be represented by the 32-bit binary value 0 10000010 01000000000000000000000 as this corresponds to $(-1)^0 \times 1.01_2 \times 2^{130-127} = 1.25 \times 2^3 = 10$.

A typical floating-point unit (FPU) has three inputs for receiving three input operands A, B and C, respectively, expressed as floating-point numbers in accordance with the foregoing discussion. The FPU then uses these operands to perform a "multiply-add" instruction, which executes the arithmetic operation $\pm[(A \times C) \pm B]$. The exponent portions of operands A, B and C are provided to an exponent calculator. The mantissa portions of operands A and C are provided to a multiplier unit, while the mantissa portion of operand B is provided to an alignment shifter. A typical fixed-point unit (FXU) operates in a similar manner and also uses a multiplier unit to carry out integer multiplication.

A conventional multiplier unit uses the mantissas of operands A and C and reduces the arithmetic function (A×C) to two intermediate results, known as "sum" and "carry." These intermediate results are passed to an adder/incrementer in arithmetic logic unit (i.e., FXU or FPU). The sum and carry results operate with the exponent calculator and alignment shifter to combine the values with operand B and yield the final result of the multiply-add instruction.

With the current imperatives of energy efficiency and computation throughput, most reduced instruction set computers (RISCs) and digital signal processors (DSPs) use Booth-encoder multipliers to simultaneously address the low-power and high-speed design issues. In general, there are two basic approaches to enhance the speed of multipliers, one is the Booth algorithm and the other is the Wallace tree compressor or counter. The Booth algorithm operates on the principle that multiplication can be considered as a series of repeated additions. The number to be added is the multiplicand, the number of times that it is added is the multiplier, and the result is the product. Each step of the addition process generates a partial product. It is possible to decompose multipliers into two parts. The first part is dedicated to the generation of partial products, and the second one collects and adds them. The Booth algorithm (or a modified Booth algorithm) is used because it reduces the number of partial products. The set of partial product bits is then collected using a Wallace tree.

A typical prior art hardware multiplier 10 is illustrated in FIG. 1. A Booth encoder 12 receives the mantissa portion of operand C, and encodes the number according to the Booth algorithm. The encoded values are then forward to a multiplexer or Booth selector 14, which also has as an input the mantissa portion of operand A. Multiplexer 14 calculates the partial product bits for A×C, and then passes on them on to a Wallace tree 16 which combines the bits to generate partial products. The output of Wallace tree 16 feeds a ripple carry adder 18 which uses the partial products to figure the sum and carry results.

An exemplary Booth encoder operates sequentially on three bits of the multiplier operand C in two-bit steps, i.e., C(0 . . . 2), C(2 . . . 4), C(4 . . . 6), and so on. The Booth encoder recodes these three bits into an output value. In one known method, the output is represented as four signals named "1×," "−1×," "2×" and "−2×". Table 1 shows the cell encoding for multiplier bits C(0 . . . 2) as inputs according to this Booth algorithm:

TABLE 1

| Input | Output | | | |
|---|---|---|---|---|
| C(0...2) | −2x | −1x | 1x | 2x |
| 100 | 1 | 0 | 0 | 0 |
| 101 | 0 | 1 | 0 | 0 |
| 110 | 0 | 1 | 0 | 0 |
| 111 | 0 | 0 | 0 | 0 |
| 000 | 0 | 0 | 0 | 0 |
| 001 | 0 | 0 | 1 | 0 |
| 010 | 0 | 0 | 1 | 0 |
| 011 | 0 | 0 | 0 | 1 |

Those skilled in the art will appreciate that the output values shown in Table 1 are only for the particular three input bits C(0 . . . 2) and that the outputs from the Booth encoder cells whose inputs are C(2 . . . 4), C(4 . . . 6), etc., are determined by other tables similar to Table 1.

The encoded data (e.g., from Table 1) is used by selector 14 to generate partial sums. Selector 14 is typically arranged in two dimensional arrays, with a given multiplexer cell in the array receiving one set of the output signals from a particular booth encoder, and also receiving two bits of multiplicand operand A by one-bit step, i.e. A(0 . . . 1), A(1 . . . 2), A(2 . . . 3), and so on. For example, one multiplexer cell corresponding to multiplier bits C(0 . . . 2) uses multiplicand operand bits A(1) and A(2), and the four output signals "1×" "2×" "−1×" and "2×" from Table 1. The output signal for that particular multiplexer cell is determined by Table 2:

TABLE 2

| Input | | | | Output |
|---|---|---|---|---|
| −2x | −1x | 1x | 2x | S |
| 1 | 0 | 0 | 0 | $\overline{A(2)}$ |
| 0 | 1 | 0 | 0 | $\overline{A(1)}$ |
| 0 | 0 | 0 | 0 | 0 |
| 0 | 0 | 1 | 0 | A(1) |
| 0 | 0 | 0 | 1 | A(2) |

Again, the output values in Table 2 are only for the signals representing the particular three multiplier input bits C(0 . . . 2) and two multiplicand input bits A(1 . . . 2), and similar tables will be applied for other multiplexer cells in selector 14.

The construction of multiplier 10 is "pipelined," meaning that one component of the multiplier (e.g., Wallace tree 16) can be operating on a set of data from a first multiplication operation while other components near the front of the pipeline (e.g., Booth encoder 12 and Booth selector 14) are operating on a set of data from a subsequent multiplication operation, during the same processing cycle. While pipelining improves computational efficiency, Booth encoder 12 is still in the critical path of the multiplier dataflow, and can often slow down the effective clock frequency of the processor and increase computation latency. A bottleneck can result when the encoded data from a Booth encoder must be distributed to the multiplexer. This problem becomes more critical as the clock frequency increases, particularly above a few gigahertz.

Booth-encoder multipliers are also poorly fashioned in terms of physical layout, i.e., circuit design of an integrated circuit (IC) chip. As illustrated in the floor plan of FIG. 2A, a typical Booth encoder design puts a gap in the multiplier layout, creating wires of uneven length (in the illustrated design, the Booth encoder is adapted for double-precision floating-point operations, and utilizes 53 bits). An alternative layout illustrated in FIG. 2B has a column of Booth encoder cells at one side of the design; in this layout, the Booth encoder must further rely on additional transistor circuitry to drive long wires on the IC chip.

In light of the foregoing, it would be desirable to devise an improved Booth encoder multiplier which could reduce the latency between the encoding and multiplexer stages of the multiplier. It would be further advantageous if the multiplier could eliminate the need for a gain tree after the Booth encoding that is currently required to drive long interconnection wires.

SUMMARY OF THE INVENTION

It is therefore one object of the present invention to provide an improved Booth-encoder multiplier for use in data processing systems such as computers and digital signal processors.

It is another object of the present invention to provide such a Booth-encoder multiplier which reduces performance bottlenecks that might otherwise arise at the Booth encoding stage of the multiplier.

It is yet another object of the present invention to provide such a Booth-encoder multiplier which can reduce or eliminate the need for additional circuitry to drive the output signals of the encoder.

The foregoing objects are achieved in a multiplier circuit generally comprising a fused Booth encoder multiplexer unit which uses two input operands to produce a plurality of partial product bits for a multiplication operation, a tree unit which uses the partial product bits to generate a plurality of partial products, and an adder unit which uses the partial products to generate intermediate sum and carry results for the multiplication operation. The fused Booth encoder multiplexer unit has a plurality of encoder-selector cells, each cell having a logic tree containing a plurality of logic transistors controlled by a respective plurality of operand bit inputs and interconnected to carry out a Boolean function according to a Booth encoding and selection algorithm to produce one of the partial product bits at a dynamic node, and a latch connected to the dynamic node which maintains the value at an output node. The encoder-selector cells operate in parallel to produce the plurality of the partial product bits generally simultaneously. A given one of the logic trees in an encoder-selector cell includes a plurality of transistor stacks, each transistor stack having a plurality of logic transistors serially connected source-to-drain, with one logic transistor in each stack having a source connected to the drain of power transistor and the dynamic node, and another logic transistor in each stack having a drain connected to the source of a foot transistor which is coupled to ground. The fused Booth encoder multiplexer unit, tree unit and adder unit function in a pipeline manner with the units operating on different (i.e., sequential) data sets during a given processing cycle. The fused Booth encoder multiplexer unit may be advantageously laid out in a design of an integrated circuit chip with generally parallel multiplicand input bit wires, and generally parallel multiplier input bit wires, with the multiplicand input bit wires further being arranged generally orthogonal to the multiplier input bit wires and overlying the multiplier input bit wires, so no gap is present in the middle or at the end of the layout.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 3:
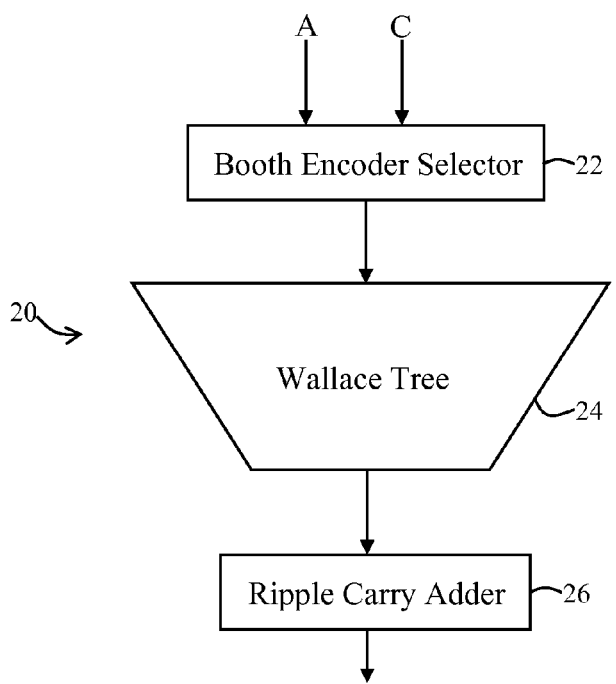
FIG. 3 is a block diagram of one embodiment of the multiplier of the present invention which uses a fused Booth encoder multiplexer.

With reference now to the figures, and in particular with reference to FIG. 3, there is depicted one embodiment 20 of a digital multiplier circuit constructed in accordance with the present invention. Multiplier 20 is generally comprised of a fused-cell Booth encoder/selector 22, a Wallace tree 24, and a ripple carry adder 26. Booth encoder/selector 22 is explained in more detail below in conjunction with FIGS. 4 and 5. Wallace tree 24 and ripple carry adder 26 may be of conventional design. The inputs to multiplier 20, i.e., to Booth encoder/selector 22, are the mantissas of operand A (the multiplicand) and operand C (the multiplier). The output of multiplier 20, i.e., from ripple carry adder 26, is passed on to other logic circuits such as an adder/incrementer of a floating-point unit (FPU) or a fixed-point unit (FXU) which uses the results to complete a multiply-add instruction. Multiplier 20 has a pipelined construction.

Multiplier 20 combines the two functions of Booth encoding and multiplexing into a single unit 22. The separate stage of Booth encoding is effectively eliminated, reducing the latency of multiplier 20 and removing any processing bottleneck that might otherwise arise at the Booth encoding stage of the multiplier. This consolidation of the two functions of encoding and multiplexing into a single logic circuit also eliminates the need for any gain tree after the Booth encoding since the results of the Booth encoding do not need to be further distributed.

Figure 4:
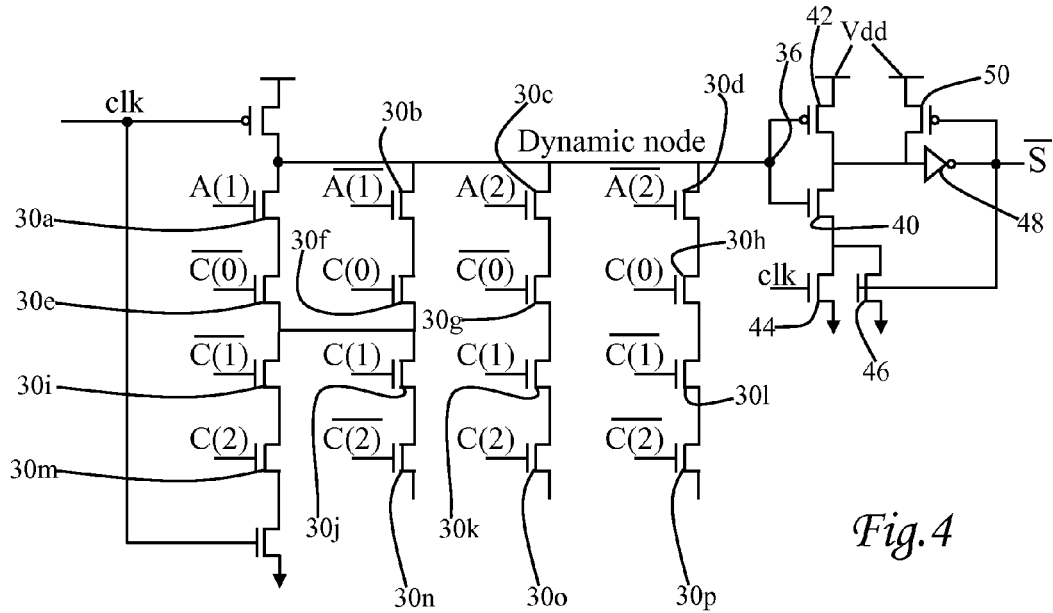
FIG. 4 is a schematic diagram of one embodiment of the fused Booth encoder multiplexer logic cell of the present invention utilizing a limited switching dynamic logic circuit.

Referring now to FIG. 4, in one implementation of the present invention the Booth encoder multiplexer is combined into a fused cell using limited switching dynamic logic. Limited switching dynamic logic (LSDL) can be used with a logic tree that has numerous inputs and provides an output that is some Boolean combination of the inputs. An LSDL circuit has a dynamic portion which evaluates the Boolean function embodied in the logic tree during a first clock phase (the evaluate phase) at a dynamic node, and a static portion which maintains the output value during a second clock phase (the precharge phase). The LSDL circuit mitigates the dynamic switching factor of dynamic logic gates by isolating the dynamic node from the output node using static logic devices. Additional details of LSDL circuits can be found in U.S. patent application Ser. No. 10/116,612 (filed Apr. 4, 2002), Ser. No. 10/242,214 (filed Sep. 12, 2002), and Ser. No. 10/242,236 (filed Sep. 12, 2002) each of which is hereby incorporated.

Booth encoder multiplexer 22 includes a plurality of LSDL cells 28 each having four levels of stacked, n-type metal oxide semiconducting (N-MOS) transistors. In the exemplary embodiment wherein multiplier 22 can handle double-precision multiplication operations, there are a total of 53×27 such cells (one for each combination of the 53 mantissa bits (0, 1, ..., 52) of operand A with every other bit of operand C). FIG. 4 illustrates the logic circuitry for only one of these cells in Booth encoder selector 22, whose output bit represents one of a plurality of the partial product bits to be used in accordance with the modified Booth algorithm.

Each stack in the logic tree of Booth encoder multiplexer 22 has four transistors as well, for a total of 16 transistors 30a-30p. Ten different signals are provided to the gates of these transistors, corresponding to a unique set of various mantissa bits of the multiplicand (A) and the multiplier (C). As those skilled in the art will appreciate, the specific mantissa bits used for a given cell depend upon which partial product the cell is calculating, according to the modified Booth algorithm. The particular cell illustrated in FIG. 4 is used to generate a partial product bit based on the mantissa bits A(1 ... 2) of the multiplicand and the mantissa bits C(0 ... 2) of the multiplier, and is thus exemplary and not to be construed in a limiting sense. For this cell, the second mantissa bit A(1) of the multiplicand is connected to the gate of transistor 30a, and the inverted second mantissa bit of the multiplicand is connected to the gate of transistor 30b. The third mantissa bit A(2) of the multiplicand is connected to the gate of transistor 30c, and the inverted third mantissa bit of the multiplicand is connected to the gate of transistor 30d. The first mantissa bit C(0) of the multiplier is connected to the gates of transistors 30f and 30h, and its complement is connected to the gates of transistors 30e and 30g. The second mantissa bit C(1) of the multiplier is connected to the gates of transistors 30j and 30k, and its complement is connected to the gates of transistors 30i and 30l. The third mantissa bit C(2) of the multiplier is connected to the gates of transistors 30m and 30o, and its complement is connected to the gates of transistors 30n and 30p. An interconnection is provided between the junction of transistors 30e-30i and the junction of transistors 30f-30j.

Each stack of transistors in the logic tree is connected drain-to-source, e.g., the drain of transistor 30a is connected to the source of transistor 30e, the drain of transistor 30e is connected to the source of transistor 30i, and the drain of transistor 30i is connected to the source of transistor 30m. The drains of the transistors 30m-30p are connected to the source of an N-MOS foot transistor 32 whose drain is connected to electrical ground. The gate of foot transistor 32 is controlled by the clock signal 34. The sources of the transistors 30a-30d are connected at a dynamic node 36, which is further connected to the drain of a p-type metal oxide semiconducting (P-MOS) power transistor 38. The source of power transistor 38 is connected to the system power supply rail ($V_{dd}$), e.g., 0.9 volts. The gate of power transistor 38 is also controlled by clock signal 34.

Dynamic node 36 is connected to the common junction of the gates of an N-MOS transistor 40 and a P-MOS transistor 42. Transistors 40 and 42 are connected drain-to-source, and form an inverter. The source of transistor 42 is connected to $V_{dd}$, and the drain of transistor 40 is connected to the sources of N-MOS transistors 44 and 46, whose drains are connected to ground. The gate of transistor 44 is controlled by the clock signal. The gate of transistor 46 is controlled by the output of an inverter 48 whose input is the signal from the inverter pair transistors 40, 42. The output of inverter 48 also controls the gate of a P-MOS transistor 50. The source of transistor 50 is connected to $V_{dd}$, and the drain of transistor 50 is connected to the input of inverter 48.

The logic tree comprised of transistors 30a-30p, along with foot transistor 32 and power transistor 34, constitute the dynamic portion of the LSDL cell. The logic tree generates a value using the Boolean function represented by the interconnection of transistors 30a-30p, which is based on the modified Booth algorithm (the logic tree may also take into account the inversion of the signal which is performed by transistors 40 and 42). In this particular example for the fused cell which produces a partial product bit based on the mantissa bits A(1 . . . 2) and C(0 . . . 2), the specific Boolean expression represented by the logic tree is:

$$S = (A(1) \oplus C(0)) \cdot (C(1) \oplus C(2)) + A(2) \cdot \overline{C(0)} \cdot C(1) \cdot C(2) + \overline{A(2)} \cdot C(0) \cdot \overline{C(1)} \cdot \overline{C(2)}$$

where $x \oplus y$ represents an exclusive-OR of x and y, x+y represents an (inclusive-) OR, and x·y represents an AND. The output for this particular cell can also be seen in Table 3:

TABLE 3

| Input C(0 . . . 2) | Output S |
|---|---|
| 100 | $\overline{A(2)}$ |
| 101 | $\overline{A(1)}$ |
| 110 | $\overline{A(1)}$ |
| 111 | 0 |
| 000 | 0 |
| 001 | A(1) |
| 010 | A(1) |
| 011 | A(2) |

Table 3 also provides another perspective on how a given cell 28 fuses the two functions of Booth encoding and selection, by comparison to Tables 1 and 2 which represent the two separate steps that are carried out according to the prior art logic circuitry.

More generally, for a cell having two multiplicand input bits A(i . . . i+1) and three multiplier input bits C(i−1 . . . i+1), the Boolean function may be represented as:

$$S = (A(i) \oplus C(i-1)) \cdot (C(i) \oplus C(i+1)) + A(i+1) \cdot \overline{C(i-1)} \cdot C(i) \cdot C(i+1) + \overline{A(i+1)} \cdot C(i-1) \cdot \overline{C(i)} \cdot \overline{C(i+1)}.$$

This function may also be described as follows. When the first bit C(i−1) of the multiplier operand is on (high or "1") and when exactly one (i.e., only one) of the second and third bits C(i . . . i+1) of the multiplier operand is on, the cell outputs the first bit A(i) of the multiplicand operand. When the first bit C(i−1) of the multiplier operand is off (low or "0") and when exactly one of the second and third bits C(i . . . i+1) of the multiplier is on, the cell outputs the complement $\overline{A(i)}$ of the first bit of the multiplicand operand. When the first bit C(i−1) of the multiplier operand is off and when both of the second and third bits C(i . . . i+1) of the multiplier operand are on, the cell outputs the second bit A(i+1) of multiplicand operand. When the first bit C(i−1) of the multiplier operand is on and both of the second and third bits C(i . . . i+1) of the multiplier operand are off, the cell outputs the complement $\overline{A(i+1)}$ of the second bit of the multiplicand operand. For the two remaining combinations wherein the multiplier bits C(i−1 . . . i+1) are either all on or all off, the cell output is off.

The output value of the logic tree is evaluated during a first phase of the clock signal (the evaluate phase). During the evaluate phase, transistors 40 and 42 are coupled between the supply voltage rails by the action of transistor 44. In the subsequent phase of the clock signal (the precharge phase), the output of inverter 48 is latched by transistor 50. This output is the complement of the output of cell 28 (S). The encoder-selector cells all operate in parallel to produce the plurality of the partial product bits generally simultaneously.

The collection of the outputs from all of the fused cells in multiplier 22 (the set of partial product bits) is used by Wallace tree 24 to generate the partial products. Ripple carry adder 26 then uses the partial products to derive the intermediate "sum" and "carry" results.

Figure 5:
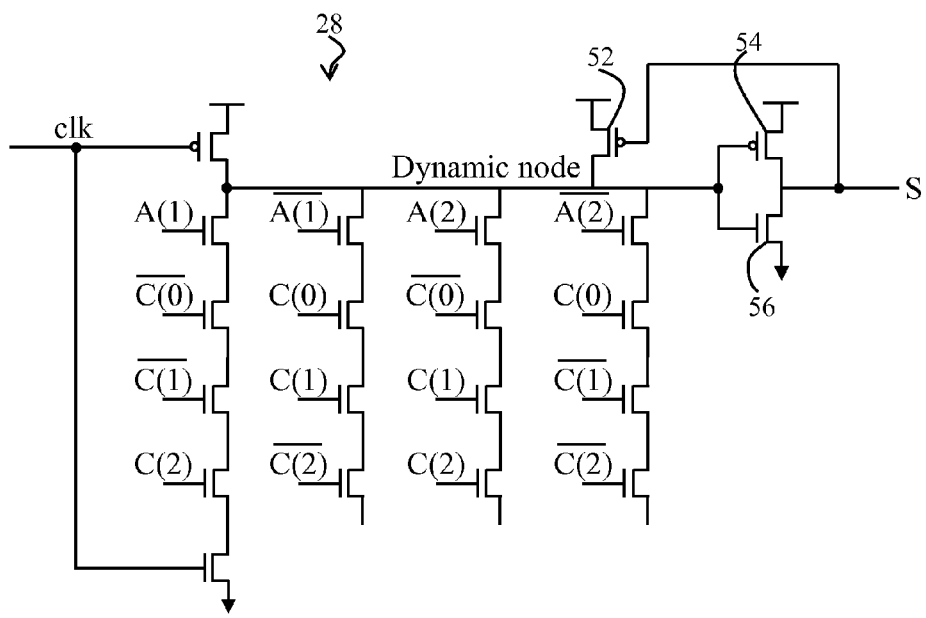
FIG. 5 is a schematic diagram of another embodiment of the fused Booth encoder multiplexer logic cell of the present invention utilizing a domino circuit.

The present invention is not limited to the use of LSDL circuits for the cells. FIG. 5 illustrates an alternative implementation for the fused booth encoder multiplexer cell which uses a domino circuit. The logic tree of this cell 28' is identical to the logic tree of the LSDL cell 28. However, cell 28' uses a domino latch comprising a P-MOS transistor 52 and an inverter formed by another P-MOS transistor 54 and an N-MOS transistor 56. The dynamic node of the logic tree is connected to the drain of P-MOS transistor 52 and the gates of transistors 54 and 56. The sources of P-MOS transistors 52 and 54 are connected to $V_{dd}$, and the drain of N-MOS transistor 56 is connected to ground. The output of the inverter (i.e., the drain of P-MOS transistor 54 and the source of N-MOS transistor 56) is connected to the gate of P-MOS transistor 52, and is the output of cell 28' (S).

FIGS. 4 and 5 are representative of two different circuits for carrying out the present invention, but other variations of these circuits will become apparent to those skilled in the art upon reference to this specification, including various manners of interconnecting the clock signal, dynamic node and latch portion of the circuit.

Figures 1, 2A:
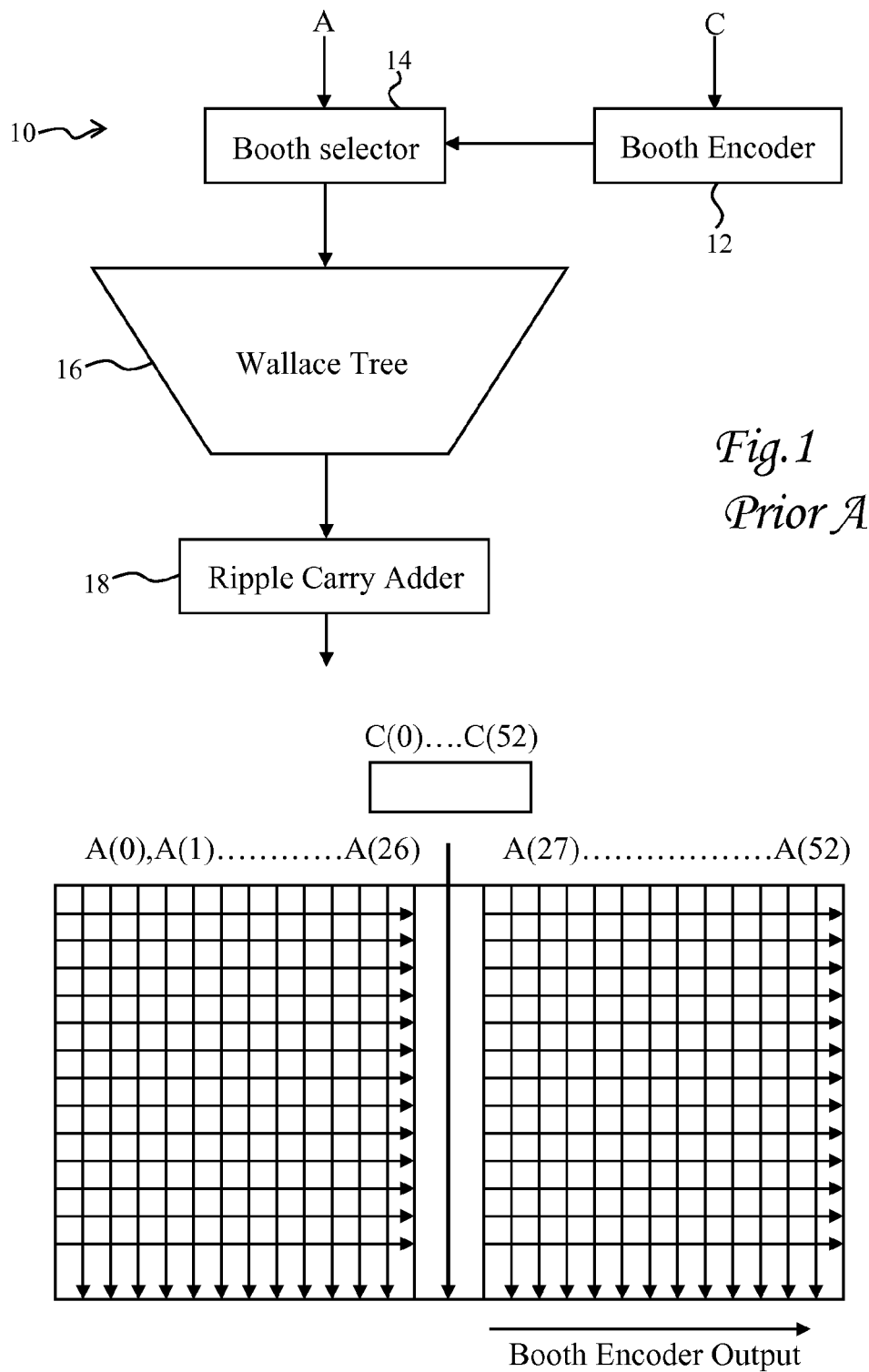
FIG. 1 is a block diagram of a conventional Booth-encoder multiplier, having a Booth encoder and a separate multiplexer (selector)
FIGS. 2A and 2B are high-level plan views illustrating alternative circuit layouts for the Booth encoder of FIG. 1.
Figure 2B:
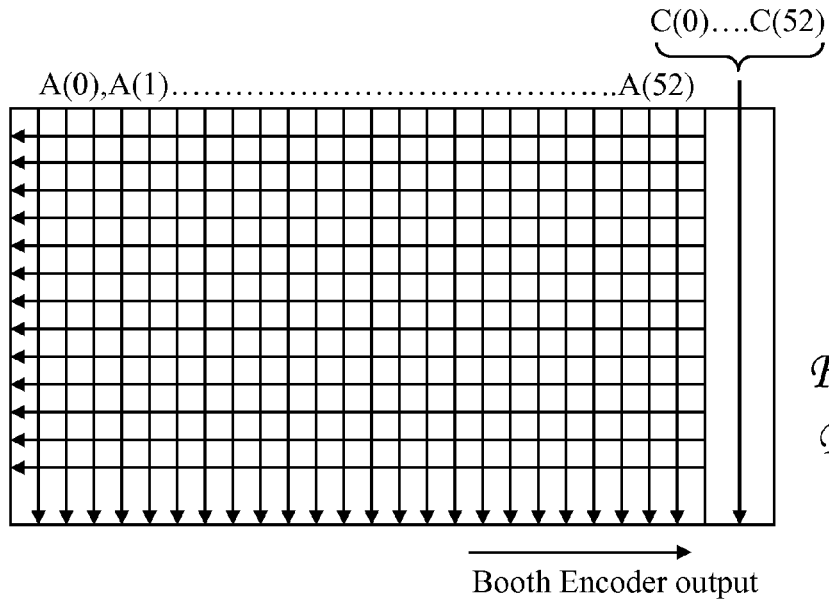
Figure 6:
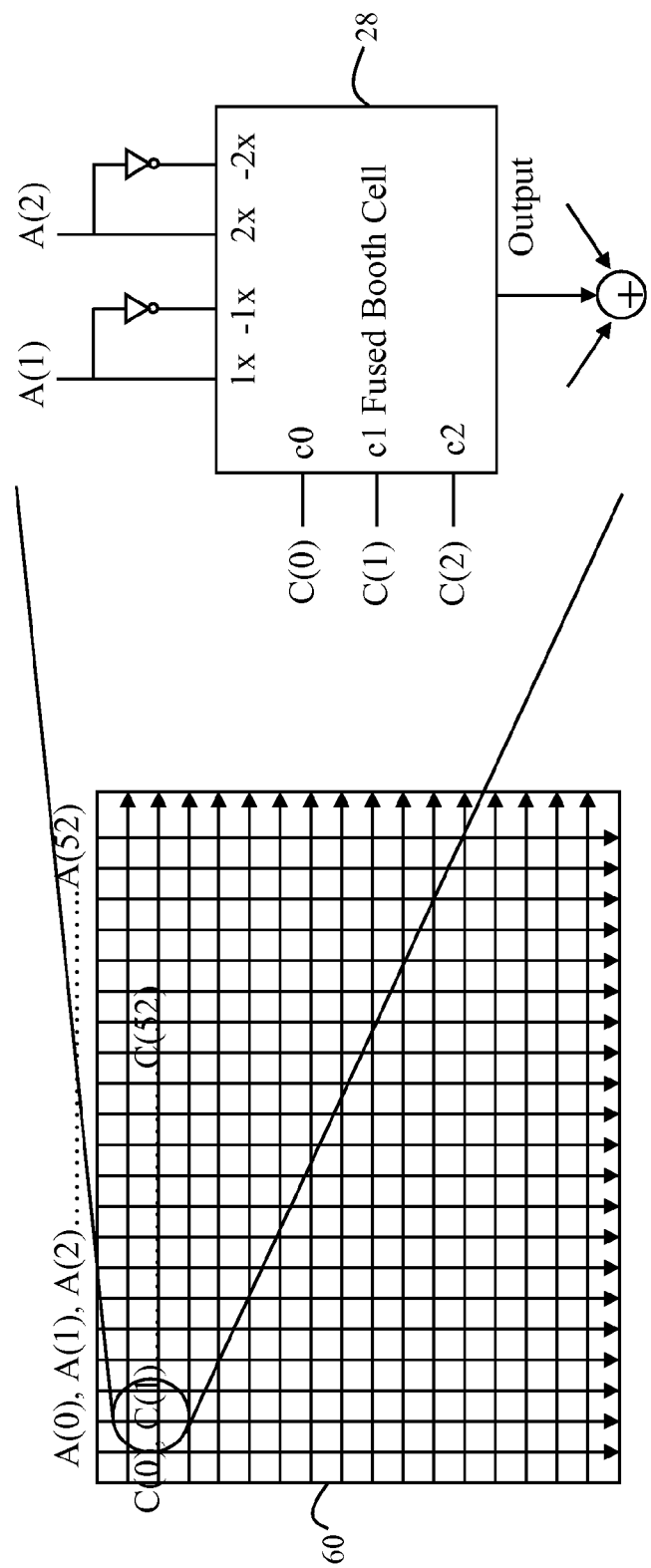
FIG. 6 is a high-level plan view illustrating a circuit layout for one implementation of the Booth encoder multiplexer of the present invention with a detail view showing the fused cell inputs and output.

The fused Booth encoder selector constructed in accordance with the present invention may be physically implemented on a multi-layered integrated circuit (IC) chip 60 using a simplified floor plan such as that shown in FIG. 6. The fused cells are placed in a two-dimensional array. The mantissa bit input wires for multiplicand operand A are distributed vertically, while the overlying mantissa bit input wires for multiplier operand C are distributed horizontally (i.e., the wires for the two operands are generally orthogonal). A given fused cell within this array receives two bits from the multiplicand operand and three bits from the multiplier operand. The result from the fused cell goes into a 3-to-2 carry/save adder, which is the first stage of the Wallace tree. This floor plan has no gap in the middle or side as in the prior art (compare FIGS. 2A and 2B), and allows for uniform wire lengths.

While this design does not require any extra wires to interconnect the operand input bits with the logic cells, the use of the LSDL or domino cells 28, 28' does require more transistors as compared to the prior art approach which has a separate Booth encoder. It is estimated that the foregoing implementations require about 20% more transistors than conventional multipliers. However, the performance improvement justifies the increased transistor count. Moreover, with the design of FIG. 6 there is no need for the very large transistors that would otherwise be required to drive the relatively long distribution wires.

Figure 7:
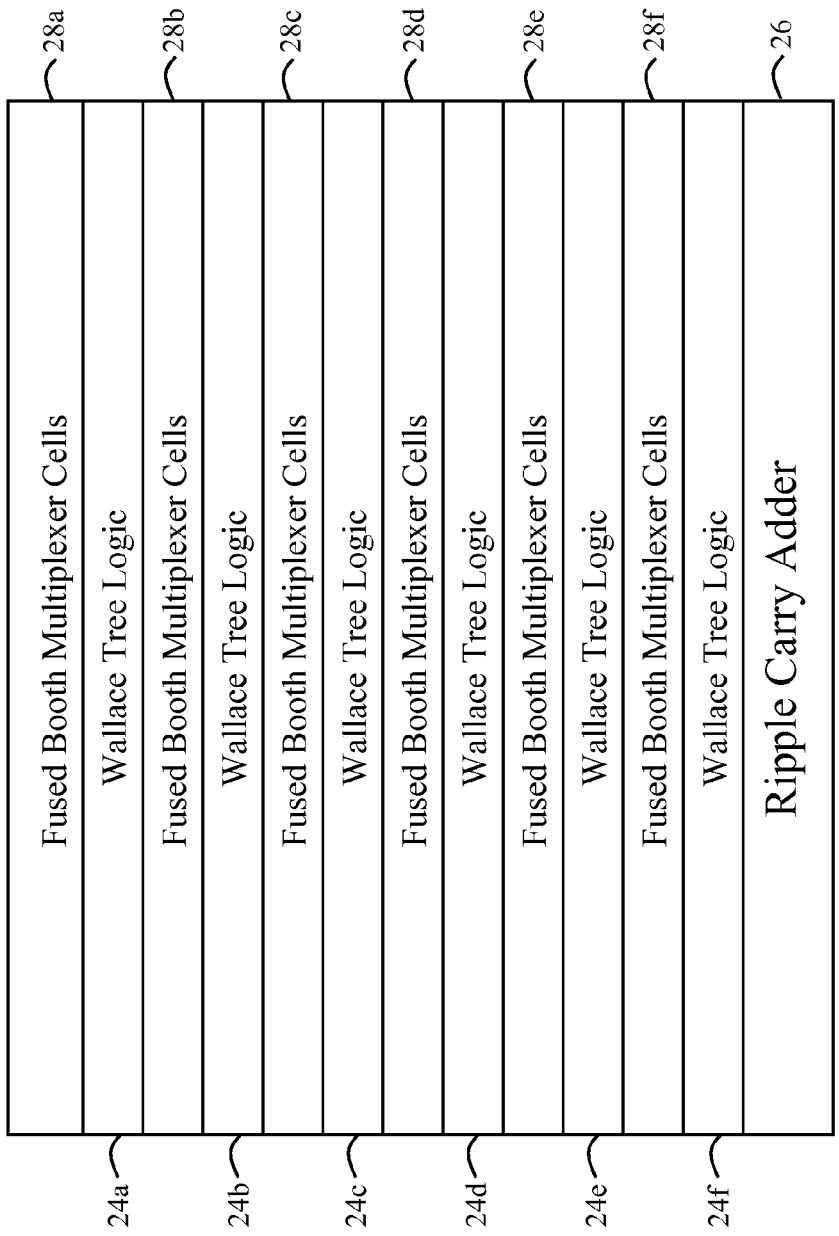
FIG. 7 is a high-level floor plan illustrating a circuit layout for one implementation of the multiplier of FIG. 3.

FIG. 7 illustrates a circuit layout for the entire multiplexer 20 according to one implementation of the present invention. The Wallace tree logic and Booth encoder multiplexer are interleaved in this design, i.e., the Booth encoder multiplexer includes a plurality of fused cell arrays 28a-28g interposed between the carry/save adders 24a-24f of the Wallace tree. Ripple carry adder 26 is at the bottom of the interleaved stack.

Figure 8:
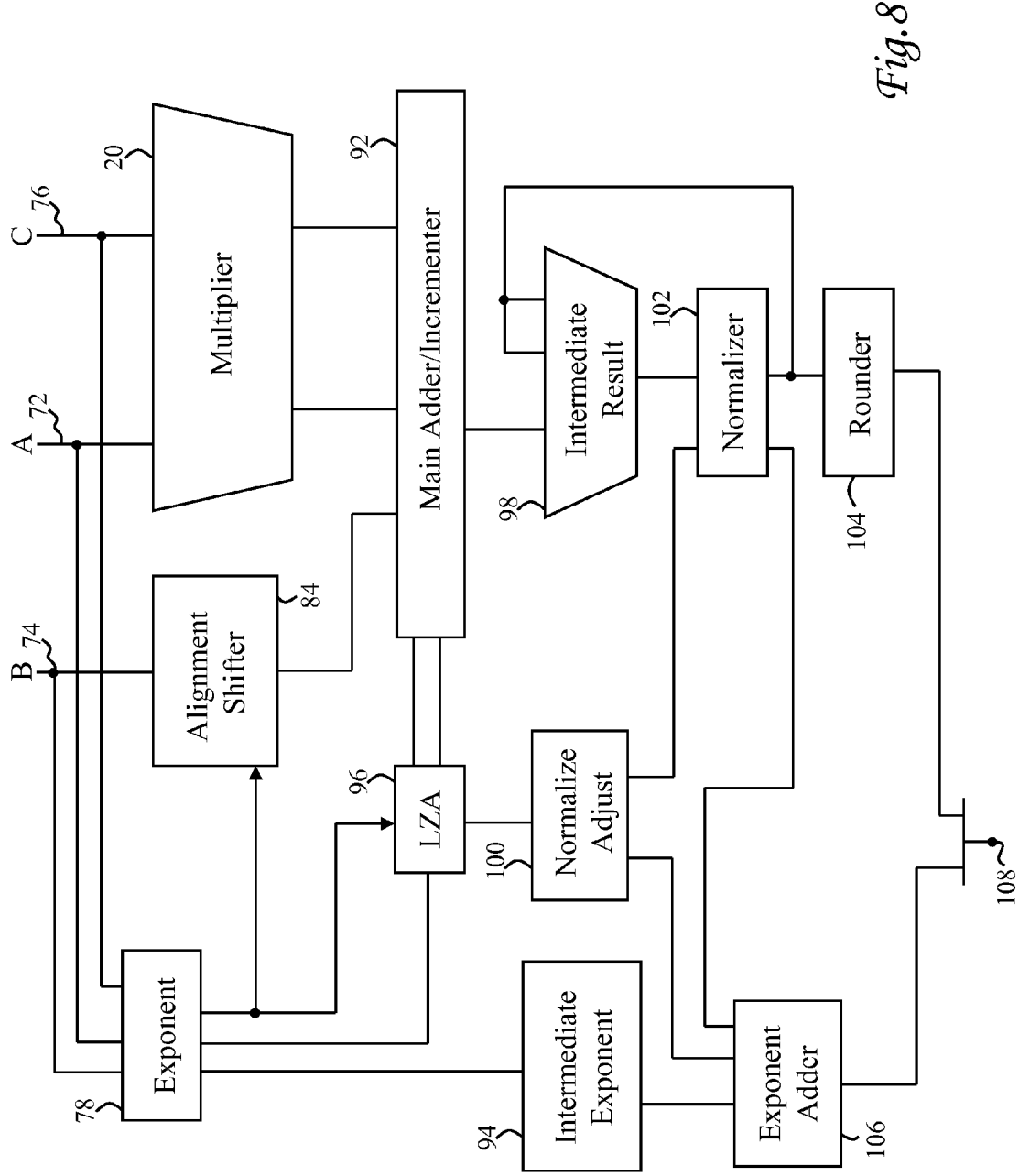
FIG. 8 is a block diagram depicting one embodiment of a floating-point unit constructed in accordance with the present invention, which utilizes the multiplier of FIG. 3.

With further reference to FIG. 8, there is illustrated a high-level block diagram of a floating-point execution unit 70 constructed using the novel multiplier of the present invention. Floating-point execution unit 70 includes three inputs 72, 74, and 76 for receiving input operands A, B, and C, respectively, expressed as binary floating-point numbers. Floating-point execution unit 70 uses these operands to perform a multiply-add instruction. The multiply-add instruction executes the arithmetic operation ±[(A×C)±B]. The exponent portions of operands A, B, and C received at inputs 72, 74, and 76 are provided to an exponent calculator 78. The mantissa portions of operands A and C are provided to a multiplier 82, while the mantissa portion of operand B is provided to an alignment shifter 84. As used herein, the term "adding" inherently includes subtraction since the B operand can be a negative number.

As explained above, multiplier 20 receives the mantissas of operands A and C and calculates the sum and carry results. These intermediate results are provided to a main adder/incrementer 92. Exponent calculator 78 calculates an intermediate exponent from the sum of the exponents of operands A and C and stores the intermediate exponent in an intermediate exponent register 94. Exponent calculator 78 also calculates the difference between the intermediate exponent and the exponent of operand B, and decodes that value to provide control signals to both a leading zero anticipator (LZA) 96 and alignment shifter 84. Alignment shifter 84 shifts the mantissa of operand B so that the exponent of operand B, adjusted to correspond to the shifted mantissa, equals the intermediate exponent. The shifted mantissa of operand B is then provided to main adder/incrementer 92. Main adder/incrementer 92 adds the shifted mantissa of operand B to the sum and carry results of multiplier 82. The output of main adder/incrementer 92 is stored in an intermediate result register 98.

Simultaneously with the mantissa addition in main adder/incrementer 92, LZA 96 predicts the position of the leading one in the result. LZA 96 computes a normalize adjust based on the minimum bit position, which is stored in a normalize adjust register 100. The normalize adjust from normalize adjust register 100 is provided, together with the intermediate result mantissa from intermediate result register 98, to a normalizer 102. Normalizer 102 performs the shifting required to place the leading one in the most significant bit position of the result mantissa. The shifted mantissa is then provided to a rounder 104, which rounds-off the result mantissa to the appropriate number of bits.

The normalize adjust from normalize adjust register 100 is also provided to an exponent adder 106. To obtain the proper exponent, the exponent is initially adjusted to correct for the maximum shift predicted by leading zero anticipator 96. If the final result of main adder/incrementer 92 requires only the minimum shift, a late "carry-in" to the exponent adder corrects for the minimum shift amount. To adjust the exponent for the maximum shift predicted, the two's complement of the maximum bit position is added to the intermediate exponent. The addition of the exponent adjust to the intermediate exponent may be initiated as soon as the exponent adjust is available from leading zero anticipator 96, which will typically be before the result from main adder/incrementer 92 becomes available.

The final result mantissa from rounder 104 is combined with the final exponent from exponent adder 106 and forwarded at output 108, to a result bus of floating-point execution unit 70. When used as a component of a microprocessor, the floating-point result may be directly written to a floating-point register or to a designated entry in a rename buffer.

Other arithmetic logic units (besides floating-point units) can be similarly constructed using multiplier 20, such as a fixed-point unit.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A fused Booth encoder multiplexer logic cell comprising:
  a logic circuit having a plurality of operand input bits including multiplier input bits and multiplicand input bits, a dynamic node, a clock input, a logic tree containing a plurality of logic transistors, each logic transistor in said logic tree having a gate connected to one of the operand input bits and said logic transistors being interconnected to carry out a Boolean function according to a Booth encoding and selection algorithm to produce a partial product bit for a multiplication operation at the dynamic node in a single clock phase, a power transistor coupling said logic tree to a voltage source, said power transistor being controlled by said clock input, a foot transistor coupling said logic tree to electrical ground, said foot transistor being controlled by said clock input, and a latch connected to said dynamic node which maintains the partial product bit at an output node, said latch being controlled by said clock input, wherein said latch includes:
    a first P-MOS transistor having a gate connected to said dynamic node, a source connected to said voltage source, and a drain;
    a second P-MOS transistor having a gate, a source connected to said voltage source, and a drain connected to said drain of said first P-MOS transistor;
    a first N-MOS transistor having a gate connected to said dynamic node, a source connected to said drains of said first and second P-MOS transistors, and a drain;
    a second N-MOS transistor having a gate connected to said clock input, a source connected to said drain of said first N-MOS transistor, and a drain connected to electrical ground;
    a third N-MOS transistor having a gate, a source connected to said drain of said first N-MOS transistor, and a drain connected to electrical ground; and
    an inverter having an input connected to said drains of said first and second P-MOS transistors, and an output connected to said gates of said first P-MOS transistor and said third N-MOS transistor, said inverter output being further connected to said output node to produce an inverted value;
    wherein said first P-MOS transistor and said first N-MOS transistor invert the value from the dynamic node, and the Boolean function of said logic tree accounts for inversion of the value by said first P-MOS transistor and said first N-MOS transistor.

2. A fused Booth encoder multiplexer utilizing a plurality of fused Booth encoder multiplexer logic cells according to claim 1, wherein:
  the logic cells are arranged in a two-dimensional array on an integrated circuit and operate in parallel to produce a respective plurality of partial product bits; and
  a given one of the logic cells has a unique set of multiplicand and multiplier input bits.

3. The fused Booth encoder multiplexer logic cell of claim 1 wherein:

the operand inputs bits include two multiplicand input bits A(i ... i+1) and three multiplier input bits C(i−1 ... i+1); and the Boolean function which produces the partial product bit is given by the expression $$S=(A(i) \oplus C(i-1)) \cdot (C(i) \oplus C(i-1))+A(i+1) \cdot \overline{C(i-1)} \cdot C(i) \cdot C(i+1)+\overline{A(i+1)} \cdot C(i-1) \cdot \overline{C(i)} \cdot \overline{C(i+1)}.$$

4. The fused Booth encoder multiplexer logic cell of claim 1 wherein said logic tree includes a plurality of transistor stacks, each transistor stack having a plurality of said logic transistors serially connected source-to-drain, with one logic transistor in each stack having a source connected to said drain of power transistor and said dynamic node, and another logic transistor in each stack having a drain connected to said source of said foot transistor.

5. The fused Booth encoder multiplexer logic cell of claim 4 wherein a first source/drain junction in a first one of said transistor stacks is connected to a second source/drain junction in a second one of said transistor stacks.

\* \* \* \* \*